United States Patent [19]

Ozaki

[11] 4,047,603
[45] Sept. 13, 1977

[54] MULTI-SPEED BICYCLE FREE WHEEL ASSEMBLY

[75] Inventor: Nobuo Ozaki, Sakai, Japan

[73] Assignee: Maeda Industries, Ltd., Osaka, Japan

[21] Appl. No.: 655,532

[22] Filed: Feb. 5, 1976

[51] Int. Cl.² ............... F16D 23/00; F16H 11/08; F16H 9/24

[52] U.S. Cl. .................... 192/64; 74/243 DR; 74/611; 308/174

[58] Field of Search .......... 74/243 R, 243 DR, 217 B, 74/217 C, 217 S, 611; 192/64; 308/174

[56] References Cited

U.S. PATENT DOCUMENTS 3,648,519  3/1972  Nakata et al. ............... 74/217 B

Primary Examiner—Samuel Scott
Assistant Examiner—Allan R. Burke

Attorney, Agent, or Firm—Birch, Stewart, Kolasch and Birch

[57] ABSTRACT

A multi-speed bicycle free wheel assembly comprises a free wheel body and a plurality of sprocket wheels different in diameter and fixedly mounted on the free wheel body, the free wheel body including an inner ring or driven member, an outer ring or drive member, a ratchet mechanism interposed between the two members for transmitting one way drive power to the outer ring, and a screw cup screwably secured to one side of the free wheel body, the screw cup having an annular flange formed integral with and extending circumferentially from a screw cup body, the annular flange extending parallel to and beyond the smallest sprocket wheel so as to prevent a bicycle drive chain from being accidentally disengaged outward from the smallest sprocket wheel disposed outmost relative to other larger sprocket wheels.

3 Claims, 3 Drawing Figures

U.S. Patent  Sept. 13, 1977  4,047,603
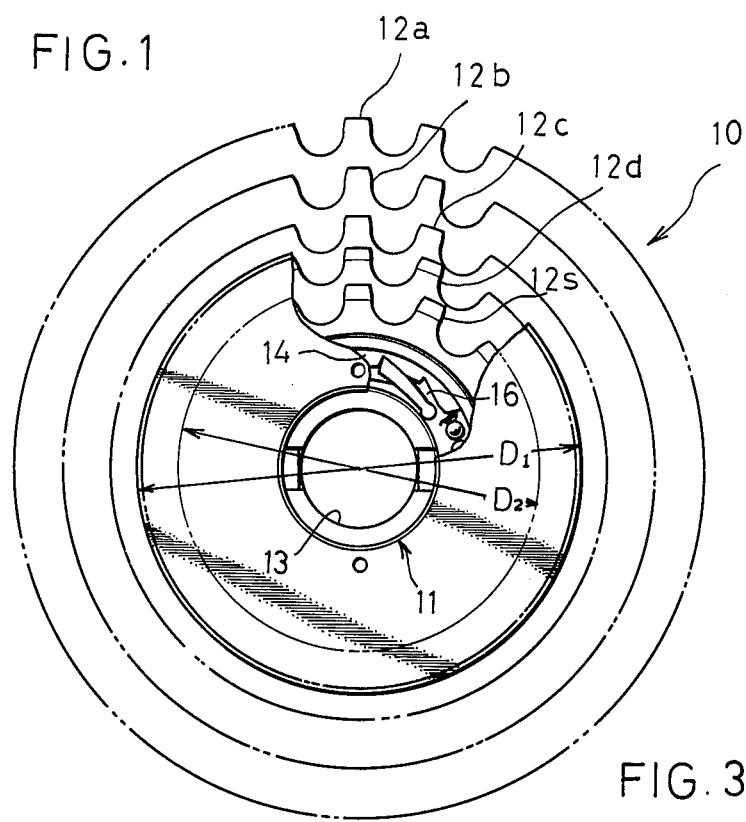
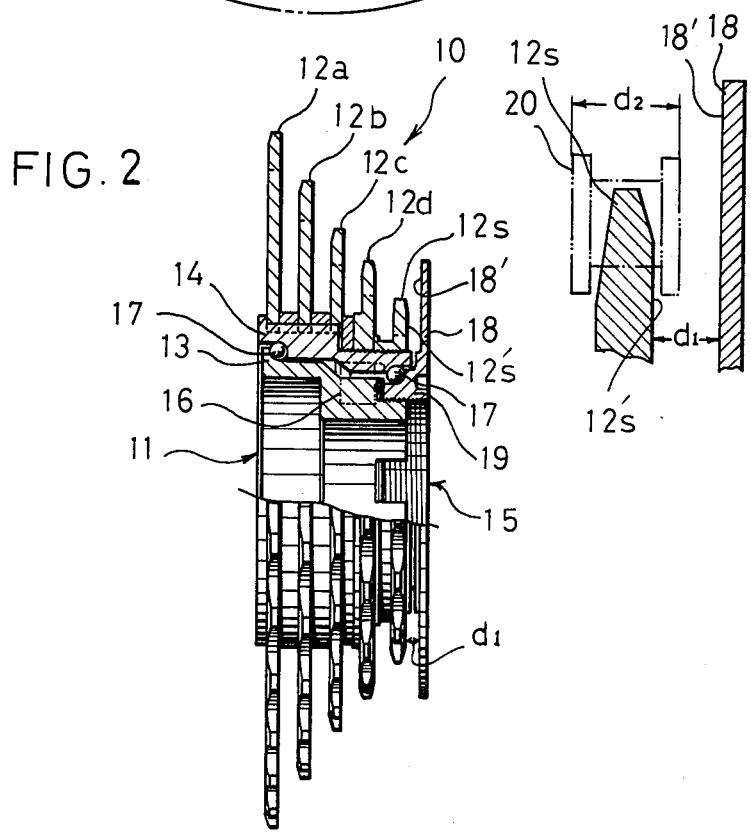

MULTI-SPEED BICYCLE FREE WHEEL ASSEMBLY

BACKGROUND AND SUMMARY OF INVENTION

The present invention relates to a bicycle free wheel assembly, and more particularly to an improvement in a multi-speed bicycle free wheel assembly having a plurality of sprocket wheels which are different in diameter and are arranged in parallel to one another.

As is well known, a multi-speed bicycle free wheel assembly is externally installed on one end of a rear wheel axle of a bicycle so that it can cooperate with a rear derailleur to facilitate a desired speed change of a bicycle. It has been observed that a running drive chain of a bicycle may be unexpectedly disengaged or fall out of the smallest sprocket wheel (top gear) which is disposed outmost of the free wheel assembly, when the running chain is shifted from a lower gear to the top gear, viz., from one of the larger sprocket wheels to the smallest sprocket wheel under the known chain-swing operation of the rear derailleur. And serious accidents and bodily injuries to riders have been attributed to such disengagement of the running chain from the free wheel assembly during cycling.

In eliminating the above-mentioned deficiency, it has been apparent to those skilled in the art that the undesirale disengagement of the running chain can be prevented by provision of a proper chain fall preventing device in position near the outward surface of the smallest sprocket wheel. In fact, several kinds of chain fall preventing devices such as a finger type, a nail type, a semi-circular disc type, a hook type or the like have been proposed. Such conventional chain fall preventing devices are of two varieties. The first group are those in the form of a separately-made piece to be fixedly secured to a suitable portion of a shifter body or in the vicinity of a rear derailleur or to a derailleur mounting bracket with one or more mounting screws. The second group are those in the form of an integral part which offsets or extends from a certain portion of the shifter body, a pulley cage or other parts of a rear derailleur or from a rear derailleur mounting bracket. However, all such conventional chain fall preventing devices are designed for use only in a specific bicycle of a certain manufacturer and therefore cannot be applicable to other bicycles produced by other manufacturers. Further, it may not be easy to incorporate a conventional chain fall preventing device with a rear derailleur or near its vicinity because most of the conventional devices are rather intricate in construction, and postion adjustment is usually required so that a chain fall restricting surface of the conventional device may face operatively toward the outward surface of the smallest sprocket wheel of a free wheel assembly because some conventional devices are not symmetrical in configuration. Further, none of the conventional chain fall preventing devices are designed to cover the total outward surface of the smallest sprocket wheel due to the fact that they are not easily accessible thereto since they are provided not with a free wheel assembly per se but with a rear derailleur or with a rear derailleur mounting bracket. Still further, most of the conventional chain fall preventing devices may not be easy to manufacture and thus are not low in cost due to their peculiar configuration. Furthermore, the conventional chain fall preventing devices in the form of a separately-made piece have a disadvantage that an extra process is required in assembling. Also, those in the form of an integral part formed with a rear derailleur or with a derailleur mounting bracket or the like have a fatal disadvantage, when the chain fall preventing device itself is broken or damaged, the whole assembly must be changed, which is very uneconomical.

According to the present invention, the chain fall preventing device is incorporated with a bicycle free wheel assembly per se. More particularly, the chain fall preventing function is performed by an annular flange which is formed with a known screw cup of a free wheel assembly. The smooth inward surface of the flange may be positioned with a certain small space from the outward surface of the smallest sprocket wheel of the free wheel assembly.

It is, therefore, a principal object of the present invention to provide an improved and novel multi-speed bicycle free wheel assembly having a device for preventing a drive chain from being accidentally disengaged outwardly from the smallest sprocket wheel.

Another object of the invention is to provide a multi-speed free wheel assembly which is designed to prevent a drive chain from falling out of the smallest sprocket wheel without increasing the number of elements or pieces of a free wheel assembly.

A further object of the invention is to provide a multi-speed free wheel assembly which carries out a desired chain fall prevention without any change to a conventional assembling process.

A still further object of the invention is to provide a multi-speed free wheel assembly having a chain fall preventing device which can be easily incorporated with the free wheel assembly without position adjustment.

A yet further object of the invention is to provide a multi-speed free wheel assembly having a chain fall preventing device which is more effective than any other conventional chain fall preventing devices.

The above and other objects, features and advantages of the present invention will become more apparent from the following description of one of the preferred embodiment thereof taken in conjunction with the accompanying drawing.

BRIEF DESCRIPTION OF THE DRAWING

The present invention will become more fully understood from the detailed description given hereinbelow and the accompanying drawings which are given by way of illustration only, and thus are not limitative of the present invention, and wherein:

FIG. 1 is a schematic front elevation of a free wheel assembly according to the present invention, with parts broken away;

FIG. 2 is a side elevational view of FIG. 1, illustrated partially in section; and FIG. 3 is a greatly enlarged sectional elevation illustrating a part of FIG. 2 with an engaged bicycle drive chain indicated in schematic phantom lines.

DESCRIPTION OF THE PREFERRED EMBODIMENT

Referring now by reference numerals to the drawing, and in particular to FIGS. 1 to 3, a multi-speed bicycle free wheel assembly 10 according to the present invention has a free wheel body 11 and a plurality of sprocket wheels 12a to 12s mounted on said body 11, as is customary in such mechanism. The free wheel body 11 includes a known inner ring or driven member 13 to be mounted on a rear wheel axle for co-axial rotation therewith, a known outer ring or drive member 14 coupled circumferentially with said inner ring 13, and a screw cup 15 which is especially designed in accordance with the present invention. Between said inner ring 13 and the outer ring 14 is interposed a known ratchet mechanism 16 as well as one or more series of known ball bearings 17 in the conventional manner so that they cooperate to transmit one way drive power and to permit one way free rotation of the outer ring 14 relative to the inner ring 13. A plurality of spaced sprocket wheels 12a, 12b, 12c, 12d and 12s which are mounted on the outer ring 14, vary in diameter with respect to each other and are fixedly mounted in parallel to one another so that they can be rotated together with the outer ring 14 in the conventional manner.

Said screw cup 15 is screwably secured to one side of the free wheel body 11 in the conventional manner. However, the screw cup 15 in accordance with the present invention is different from conventional screw cups, since it includes an annular flange 18 formed integral with and extending circumferentially from a known substantially cylindrical screw cup body 19. Said annular flange 18 has a smooth inward surface 18' which extends in parallel to the smallest sprocket wheel 12s that is disposed outmost relative to other sprocket wheels 12a to 12d. More particularly, the inward surface 18' of the flange 18 is in parallel to but spaced from the outward surface 12's of the smallest sprocket wheel 12s, and the distance ($d_1$) between said two surfaces 18' and 12's is not greater than the maximum lateral width ($d_2$) of a bicycle drive chain 20 as shown in phantom line in FIG. 3. Further, it will be easily understood that said distance ($d_1$) should be larger than one half of said width ($d_2$) of the chain 20 so that the chain is allowed to shift into engagement with the smallest sprocket wheel 12s without difficulty.

The annular flange 18 extends beyond the peripheral edge of the smallest sprocket wheel 12s. Namely, the external diameter $D_1$ of the annular flange 18 is greater than the maximum external diameter $D_2$ of the smallest sprocket wheel 12s.

As apparent from the foregoing description, the screw cup 15 according to the present invention may be quite easily replaced with a conventional non-flanged screw cup without any problems due to fundamental design change in the free wheel assembly. Therefore, other parts of the conventional free wheel assembly are still used in the conventional manner.

In operation, when a running chain which is in engagement with one of the larger sprocket wheels 12a to 12d is shifted onto the smallest sprocket wheel 12s under the known swing operation of a rear derailleur, the chain will never ride over the smallest sprocket wheel 12s, because the inward surface 18' of the annular flange 18, which is larger than the smallest sprocket wheel 12s, restricts surh riding over of the chain in every situation. Further, the chain will not drop into the space between the outward surface 12's of the smallest sprocket wheel and the inward surface 18' of the annular flange since the distance ($d_1$) is defined so as to be smaller than the maximum lateral width ($d_2$) of the chain. Thus, the chain is effectively prevented from being accidentally disengaged from the smallest sprocket wheel.

The present invention being thus described, it will be obvious that the same may be varied in many ways. Such variations are not to be regarded as a departure from the spirit and scope of the invention, and all such modifications are intended to be included within the scope of the appended claims.

What I claim is:

1. A multi-speed bicycle free wheel assembly comprising
   a free wheel body,
   a plurality of sprocket wheels which are different in diameter and are fixedly mounted in parallel to one another on said free wheel body,
   a smallest sprocket wheel among said plurality of sprocket wheels being disposed outmost relative to other larger sprocket wheels,
   said free wheel body including an inner ring or driven member, an outer ring or drive member, and a screw cup secured to one side of said free wheel body,
   ratchet means interposed between said inner ring and said outer ring,
   said screw cup having a substantially cylindrical screw cup body and an annular flange formed integral with said screw cup body,
   said annular flange extending in confronting and parallel relation to said smallest sprocket wheel, and
   said screw cup includes a threaded portion being designed to mate and engage a threaded portion of the driven member,
   said screw cup also includes a bearing surface being designed to engage a bearing member positioned between the bearing surface of the screw cup and the drive member.

2. The bicycle free wheel assembly, as set forth in claim 1, wherein
   a maximum external diameter $D_1$ of said annular flange is greater than a maximum external diameter $D_2$ of said smallest sprocket wheel.

3. The bicycle free wheel assembly, as set forth in claim 1, wherein
   a distance ($d_1$) between an outward surface of said smallest sprocket wheel and an inward surface of said annular flange is not greater than a maximum lateral width ($d_2$) of a bicycle chain to be employed therewith.

* * * * *